United States Patent [19]

Kasserra

[11] 4,083,922

[45] Apr. 11, 1978

[54] PROCESS FOR THE MANUFACTURE OF AMMONIUM AND ALKALI METAL TUNGSTATES

[75] Inventor: Hans Peter Kasserra, Brockville, Canada

[73] Assignee: Du Pont of Canada Limited, Montreal, Canada

[21] Appl. No.: 766,425

[22] Filed: Jan. 27, 1977

[30] Foreign Application Priority Data

Jan. 29, 1976 Canada ............................... 244543

[51] Int. Cl.$^2$ ............................................. C01G 41/00
[52] U.S. Cl. ..................................... 423/56; 423/53; 423/58; 423/61; 423/606; 423/593; 75/97 R; 75/101 R; 75/103; 75/121
[58] Field of Search .................. 423/53, 56, 58, 61, 423/606, 593; 75/97 R, 101 R, 103, 121

[56] References Cited

U.S. PATENT DOCUMENTS

| 1,255,144 | 2/1918 | Ekeley et al. ........................... 423/58 |
| 1,388,857 | 8/1921 | Giles et al. .............................. 423/58 |
| 1,535,019 | 4/1925 | Dorsey .................................. 423/606 |
| 2,992,916 | 7/1961 | Newkirk .................................. 75/101 |
| 3,429,693 | 2/1969 | Bauer et al. ............................. 423/61 |
| 3,717,697 | 2/1973 | Gillchriest ............................. 423/53 |

*Primary Examiner*—Herbert T. Carter

[57] ABSTRACT

A process is provided for the manufacture of a tungstate salt, especially ammonium tungstate. The process comprises treating finely divided metallic tungsten and/or intermetallic iron/tungsten species with an aqueous solution in the presence of an oxidizing agent, such as oxygen or hydrogen peroxide. The solution contains cations which are ammonium and/or alkali-metal ions and anions which are hydroxide, carbonate and/or bicarbonate ions. The finely divided material generally contains no more than impurity quantities of alkaline earth metals. The process is useful in deriving tungsten values from wolframite ores, which are reduced prior to the aqueous treatment.

7 Claims, No Drawings

PROCESS FOR THE MANUFACTURE OF AMMONIUM AND ALKALI METAL TUNGSTATES

BACKGROUND OF THE INVENTION

1. Field of the Invention

This invention relates to a process for preparing a tungstate salt. More particularly, the invention concerns a process for preparing ammonium tungstate and related compounds from reduced iron/manganese tungstates or ores or concentrates thereof.

2. Prior Art

Iron and manganese form a range of tungstate minerals varying in composition between $FeWO_4$ and $MnWO_4$. These minerals are generally referred to as ferberite, wolframite and huebnerite, depending on the composition of the mineral. Generally, ferberite is used to describe such a mineral containing more than 20% by weight of FeO and huebnerite when such a mineral contains more than 20% by weight of MnO. The intermediate compositions are referred to as wolframite, although this term is often used for the whole range of compositions; such use may be made hereinafter. These iron and manganese tungstates are important sources of tungsten trioxide and metallic tungsten.

In conventional processes for recovering tungsten values from wolframite ores, the ores are usually concentrated by gravity, magnetic and/or flotation techniques. The concentrates so formed are then processed further. Tungstate salts are often formed as intermediates in these processes. For example, sodium tungstate can be obtained by fusing a concentrate with sodium carbonate or by contacting a concentrate with hot sodium hydroxide solution. Acidification of the aqueous sodium tungstate solution yields insoluble tungstic acid. Alternatively, tungstic acid can be obtained from the concentrate by leaching the concentrate with a strong acid, such as concentrated hydrochloric acid. The tungstic acid can then be dissolved in ammonium hydroxide to form ammonium tungstate, which in turn can be isolated, dried and heated to form tungsten trioxide, tungsten and other useful tungsten compounds by techniques such as those described in K. C. Li and C. Y. Wang, "Tungsten", American Chemical Society Monograph 130, Reinhold Publishing Corporation, New York (1955), especially Chapter IV.

The ammonium tungstate is believed to be the paratungstate salt, which may be defined as having the formula $x(NH_4)_2O.yWO_3.zH_2O$ with, for example, $x=3$ and $y=7$ or $x=5$ and $y=12$, the value of $z$ depending on the conditions of crystallization of the salt.

Each of the above-described known processes is useful for extracting tungsten values from various tungsten compositions. However, lower levels of impurities in products obtained in good yields are technically and economically desirable. For example, ammonium tungstate manufactured by known processes is susceptible to contamination by impurities. The concentration of such impurities depends at least in part on the actual process conditions employed in the manufacture of the ammonium tungstate and on the composition of the tungsten ore.

SUMMARY OF THE INVENTION

The present invention provides a process for preparing a tungstate salt comprising treating a finely divided material selected from the group consisting of metallic tungsten, intermetallic iron/tungsten species and mixtures thereof with an aqueous solution, at a temperature in the range of 10° C and the boiling point of the solution, in the presence of an oxidizing agent selected from the group consisting of oxygen and hydrogen peroxide, the finely divided material being substantially free of alkaline earth metals and the aqueous solution containing cations selected from the group consisting of ammonium and sodium ions and mixtures thereof and anions selected from the group consisting of hydroxide, carbonate and bicarbonate ions and mixtures thereof. The preferred temperature range is 30° to 70° C and the preferred ions are ammonium cations and hydroxide anions. A preferred oxidizing agent is hydrogen peroxide. Another preferred oxidizing agent is oxygen, which can be introduced by bubbling pure oxygen or air through the solution.

The finely divided metallic tungsten and/or intermetallic iron/tungsten species which is treated in the process usually is obtained by heating of iron and/or manganese tungstate at elevated temperature under reducing conditions. Preferably, the iron and/or manganese tungstate is in the form of an ore or concentrate of ferberite, huebnerite or wolframite. In the reduction, reducing agents such as hydrogen, ammonia, carbon, carbon monoxide, gaseous hydrocarbons and mixtures thereof, can be used, with hydrogen, optionally containing water vapor, being preferred.

When alkaline earth metal impurities are present in the finely divided material to be treated with the aqueous solution, it is preferred to include in the solution at least one group of anions that form an alkaline earth metal compound which is insoluble in the solution. Carbonate and/or bicarbonate anions are particularly useful in this regard, and are preferably formed by passing gaseous carbon dioxide through the solution.

DETAILED DESCRIPTION OF THE INVENTION

As noted above, processes for the manufacture of tungstates, especially ammonium tungstate, from wolframite ores have been known in the art. Processes for preparing such tungstates from scheelite ores or from alkaline earth metal tungstates and compounds derived therefrom are disclosed in copending applications of H. P. Kasserra, D. B. Kelly and I. Obadia, of H. P. Kasserra and of S. P. Beaton and H. P. Kasserra, each having the same convention priority date as the present application.

The present invention concerns a process for making tungstates, especially ammonium tungstate, by treating finely divided metallic tungsten and/or iron/tungsten intermetallic species with an aqueous solution that leaches the tungsten into solution. The finely divided metallic tungsten and/or iron/tungsten intermetallic species is preferably obtained by the reduction of metal tungstates or their ores, as described hereinafter. The finely divided metallic tungsten can also be obtained by reduction of tungsten oxides.

The aqueous solution used for leaching tungsten into solution contains cations selected from the group consisting of ammonium, sodium and potassium ions and mixtures thereof. The preferred cations are ammonium ions which can be formed, at least in part, by passing ammonia gas through the solution. The aqueous solution also contains at least one group of anions which are hydroxide, carbonate and/or bicarbonate ions. The anions can be added as salts of the cations. The carbonate and bicarbonate anions can be formed by passing gaseous carbon dioxide through the solution. Preferred anions are hydroxide, carbonate and bicarbonate, especially hydroxide.

The leaching of the tungsten into solution is carried out in the presence of an oxidizing agent, preferably an excess of oxidizing agent. The oxidizing agent can be oxygen or an oxidizing agent that is at least as effective as oxygen under the leaching conditions. Examples of suitable oxidizing agents are oxygen and hydrogen peroxide. Peroxides of the alkali metals may also be suitable. The peroxides are preferably added to the solution in a continuous or semi-continuous manner. Oxygen can be passed through the solution in the form of air. Oxidation of the finely divided metallic tungsten and/or the intermetallic species prior to the leaching step can adversely affect leaching yields and is, therefore, generally avoided.

In the process, tungsten is leached into solution as a soluble tungstate. Tungsten, especially in the form of ammonium tungstate or related compounds, can be recovered from the solution of soluble tungstate by conventional techniques.

It is preferable to agitate the solution to improve the contact of the leaching solution with the finely divided metallic tungsten and/or iron/tungsten intermetallic species. Depending on the material leached, typical leaching times vary from about 30 minutes to about 20 hours. The temperature of the leaching step is preferably in the range from 10° C to the boiling point of the solution and preferably in the range of 30° to 70° C. At lower temperatures, the rate of leaching may be uneconomically slow. At the higher temperatures, difficulties may be experienced in maintaining the desired concentration of ammonia in solution. With ammonia providing ammonium cations, the preferred ammonium tungstate product is obtained. Ammonium tungstate is soluble in the ammonia solution under the treatment conditions. The ammonium tungstate is thus separable from the insoluble matter in the leaching system by, for example, filtration and/or centrifugation techniques.

If the tungstate is in the form of the ammonium salt, the ammonium tungstate can be obtained from the solution by, for example, evaporating the water. If sodium cations are used in the aqueous solution, water-soluble sodium tungstate is formed, which can be converted to tungstic acid by the addition of hydrochloric acid and then to ammonium tungstate by the addition of ammonium hydroxide. Such a conversion of sodium tungstate to ammonium tungstate is known.

The ammonium tungstate can be recrystallized, if necessary, to reduce the level of any impurities to that desired. Also, the ammonium tungstate can be converted to tungsten trioxide by heating the ammonium tungstate. Subsequently, the tungsten trioxide can be reduced to metallic tungsten. Such techniques are known and are described in more detail in the aforementioned Li and Wang reference.

Optimum treatment conditions, to achieve high rates of leaching with high levels of recovery of tungsten, depend on a number of variables, such as particle size of the finely divided metallic tungsten and intermetallic species, temperature, rate of agitation and concentration of the solution, as will be understood by those skilled in the art.

The material leached in the process of the present invention is usually substantially free of alkaline earth metals. The presence of alkaline earth metals during the treatment with the aqueous solution can cause precipitation of insoluble alkaline earth metal tungstate. Thus, a significant fraction of the tungsten might not be leached into solution and a loss of tungsten could occur. Techniques for the leaching of tungstates containing a significant amount of alkaline earth metals are described in the aforementioned copending applications. When the material to be leached in the process of the present invention contains an alkaline earth metal as an impurity, at least one of the anion groups is selected so that it forms an insoluble alkaline earth metal compound. Carbonate and bicarbonate anions are suitable for this purpose. As used herein the term "alkaline earth metal" includes calcium, strontium and barium.

The impurities in the ore or concentrate, and in particular the type of the impurities in the finely divided metallic tungsten and intermetallic species, can be a factor in determining the preferred cations for the leaching step. Generally ammonium cations are preferred, but under some circumstances other cations are useful. For example, if the ore or concentrate contains significant amounts of copper compounds, leaching the metallic tungsten or intermetallic species with ammonia solutions can result in the formation of undesirable copper-ammonia complexes which are soluble in the solution. In such cases, it is preferable to leach with solutions having alkali metal cations and, if desired, to obtain ammonium tungstate by, for example, acidification of the alkali metal tungstate solution to form insoluble tungstic acid and then redissolution with ammonia solution. Techniques for the separation of soluble copper-ammonia complexes from ammonia solutions are known. When the cations are alkali metal cations, such as sodium or potassium, materials admixed with the material being leached, such as silica, alumina, and/or compounds derived from silica, alumina, zinc and tin, if present, could be dissolved in the leach step thereby contaminating the leach solution. The effect of alkaline earth metal impurities and the technique for reducing the effect of such impurities has been described hereinabove. If the wolframite ore or concentrate contains molybdenum in the form of a molybdate, such as calcium molybdate and/or the mineral powellite, or molybdenum sulfides, such as molybdenite, the molybdenum in the material being leached may be in a form that is leachable as soluble ammonium molybdate. However, if a concentrate is used in the manufacture of the finely divided tungsten and the intermetallic species, the level of the molybdenum or copper compounds can be reduced so that the formation of soluble ammonium molybdate and/or soluble copper-ammonia complexes during leaching is not a major problem.

The process of the present invention can be operated as a batch or as a continuous process, or a mixture thereof, as each step of preferred embodiments of the process described herein can be operated in a batch or continuous manner. The process usually is operated throughout at atmospheric pressure, although superatmospheric pressures can be used, if desired.

The finely divided metallic tungsten and the intermetallic species can be produced by the reduction of tungsten trioxide, but preferably are produced by the reduction of a metal tungstate. The metal tungstate is an iron/manganese tungstate obtained synthetically or as a wolframite ore or concentrate. The reduction process will be discussed hereinafter by reference to the reduction of metal tungstates, but is applicable to the ores and concentrates as well. The metal tungstate is reduced by contacting the tungstate with a reducing agent at elevated temperatures. Variables affecting the reduction include the quantities used, the temperature, the particular reducing agent, the particle size of the tungstate to be reduced and the gas velocity if the reducing agent is a gas. The metal tungstate can be reduced by heating the tungstate in the presence of hydrogen at temperatures in the range of 600° to 1300° C and especially in the range 900°–1100° C. At lower temperatures the rate of reduction may be uneconomically slow, while at higher temperatures sintering or fusion can occur, which can affect the leachability of the reduced products. In the reduction step, hydrogen can be continuously passed over or through the tungstate and then recycled, with purification and additional hydrogen being included if needed. In a preferred embodiment of the reduction step, the hydrogen is saturated with water at 25°–75° C before contacting the tungstate.

The reduction of the metal tungstate can also be accomplished with ammonia or mixtures of ammonia and hydrogen under conditions similar to those described for reduction with hydrogen. However, at the reduction temperatures, the ammonia can dissociate and cause formation of tungsten nitrides, which can present a problem in subsequent processing steps. Carbon and/or a carbon-containing reducing agent, such as carbon monoxide, mixtures of carbon monoxide and hydrogen, gaseous hydrocarbons, synthesis gas, water gas, semi-water gas, coal gas and the like, can also be used to reduce the metal tungstates under similar conditions to those described for the reduction with hydrogen. However, tungsten carbides can sometimes form and cause subsequent processing problems. Hence, reduction of the metal tungstate with hydrogen is preferred. Other techniques for the reduction of tungstates are known and are described in more detail in the aforementioned Li and Wang reference.

The tungsten products of the reduction process are metallic tungsten and in some cases intermetallic species. The latter are formed on reduction of metal tungstates in the presence of iron. An example of an iron/tungsten intermetallic species is $Fe_7W_6$. As is illustrated hereinafter, $Fe_7W_6$ is readily leachable with, for example, the ammonia/oxygen leaching system.

Some impurities which may be present in the ores or concentrates can result in process problems. For example, arsenic and/or sulphur compounds can be volatilized in the reduction step. Such volatile compounds can be corrosive to the materials from which the reduction apparatus is constructed. Under such circumstances, it is desirable to treat the ore or concentrate for removal of such impurities prior to reduction of the ores or concentrates.

The process of the present invention provides a method which employs relatively inexpensive materials and permits manufacture of tungsten or tungsten compounds at potentially economical rates and levels of tungsten recovery. The process is substantially pollution-free; contaminants in effluent streams from the process may be treated by known techniques, if necessary, to remove any pollutants. As the process is operated under relatively mild conditions, the tungsten compounds obtainable are less susceptible to contamination by impurities. Furthermore, if ammonia and/or carbon dioxide are used in the leaching step, these materials can be recovered subsequently and recycled.

The present invention is illustrated by the following examples.

EXAMPLE I

A 4.10 g sample of a pelletized low grade huebnerite concentrate containing 18.9% by weight of tungsten trioxide and 3.5% by weight of calcium oxide was reduced at 1000° C in a vertical combustion tube which formed part of a thermal gravimetric analysis apparatus. The huebnerite was −60 mesh (U.S. sieve series). Hydrogen was passed over the sample at a rate of 3 liters/min during the reduction. Reduction was carried out until the thermal gravimetric analysis apparatus indicated no further weight loss, this taking 1 hour and 40 minutes. The reduced sample was then cooled in a nitrogen atmosphere. Analysis by X-ray diffraction indicated that the major species in the reduced product were metallic tungsten and silica. Iron tungstate, manganese tungstate and mixed iron/manganese tungstates were not detected.

A 3.66 g sample of the above prepared reduced ore was added to 200 ml of an approximately 12% aqueous solution of ammonia at 50° C. While agitating the resultant solution, ammonia gas and oxygen were each bubbled through the solution at a rate of 100 cm$^3$/minute. After 5 hours of leaching, the solution was filtered and the residue washed. The filtrate was shown by X-ray fluorescence analysis to contain 81.3% of the theoretical amount of tungsten in the reduced huebnerite, the tungsten being in the form of ammonium tungstate. X-ray diffraction analysis of the residue indicated the presence of silica, unleached metallic tungsten and calcium tungstate. The calcium tungstate is formed by the precipitation of calcium tungstate during the leaching of the tungsten from the reduced huebnerite as a result of the calcium oxide in the huebnerite. To avoid the formation of the calcium tungstate precipitate, carbonate and/or bicarbonate anions were added to the leach solution by bubbling carbon dioxide through the solution during leaching, thereby increasing the leaching efficiency.

EXAMPLE II

A 4.58 g sample of a pelletized low-grade ferberite concentrate of −60 mesh and containing 28.0% by weight of tungsten trioxide was reduced with hydrogen at 900° C using the procedure of Example I. A flow of 100–300 cm$^3$/minute of hydrogen was maintained during the reduction. After approximately 3 hours no further weight loss was recorded. The sample was quenched by dropping it into a concentrated ammonia solution at room temperature. The pellets were crushed, the solution was made up to 200 ml with concentrated aqueous ammonia and leaching was commenced immediately. Ammonia gas and oxygen were bubbled through the solution at 150 cm$^3$/minute and 100 cm$^3$/minute, respectively. The equilibrium ammonia concentration was approximately 13% by weight. The leaching was carried out, with agitation, at 50° C for 19.5 hours. The solution was filtered and the residue washed. X-ray fluorescence analysis of the filtrate showed that 89.3% of the theoretical amount of tungsten in the sample had been leached. Part of the filtrate was evaporated to dryness and roasted in air at 800° C for 3 hours. X-ray diffraction and X-ray fluorescence analyses of the resultant solid material showed that it was a very pure sample of tungsten trioxide containing traces of calcium, potassium and possibly titanium.

EXAMPLE III

A sample of a commercial wolframite concentrate of −250 mesh and containing 62.3% by weight of tungsten trioxide and 1.4% by weight of manganese oxide (MnO) was reduced with hydrogen at 1100° C. X-ray diffraction analysis of the reduced sample showed that the major species was the intermetallic species identified as $Fe_7W_6$. Metallic tungsten was also present. A 15.0 g sample of the reduced sample was added to 300 ml of an agitated aqueous sodium hydroxide solution containing 120 g/l of sodium hydroxide. Over a period of 5 hours 110 ml of 35% hydrogen peroxide was added to the solution. The temperature of the solution was 50° C. The solution was then filtered and the residue washed. X-ray fluorescence analysis of the filtrate showed that 90.8% of the theoretical amount of tungsten had been leached.

Similar results were obtained when the reduced wolframite was leached with an aqueous ammonia solution to which hydrogen peroxide was continuously added. However, when the reduced sample was leached with an aqueous solution of 240 g/l NaOH or of 212 g/l $Na_2CO_3$, through which oxygen was bubbled, the rates of leaching were significantly slower.

EXAMPLE IV

A sample of commercial wolframite concentrate containing 71.9% by weight of tungsten trioxide was substantially completely reduced by heating in hydrogen at 950° C. A 3.0 g sample of the reduced wolframite was leached at 50° C with a 12% aqueous solution of ammonia for 5 hours, during which ammonia gas and oxygen were each passed through the solution at 100 cm³/minute. After filtration, analysis of the filtrate showed that 64.3% of the tungsten had been leached from the reduced wolframite in only 3 hours and 80.4%, in only 5 hours.

EXAMPLE V

A 4.78 g sample of a commercial wolframite concentrate of −100 mesh and containing 71.9% by weight of tungsten trioxide and 8.8% by weight of manganese oxide was reduced by the procedure of Example I except that the hydrogen was replaced with a synthetic gaseous mixture containing, on a volume basis, 51.2% hydrogen, 45.0% carbon monoxide and 3.8% of carbon dioxide. The rate of flow of the gaseous mixture was about 350 cm³/minute. After 3.3 hours, there was no further weight loss. X-ray diffraction analysis of the reduced sample indicated that the major products of the reduction were mixed iron/tungsten carbides. No wolframite was detected in the reduced sample. A 3.61 g sample of the reduced concentrate was then leached by the procedure of Example I. X-ray fluorescence analysis of the leach residue obtained indicated that 78.9% of the theoretical amount of tungsten had been leached in 5 hours. X-ray diffraction analysis of the residue indicated that a major fraction of the mixed iron/tungsten carbides had been leached.

When the reduction procedure was repeated with carbon monoxide or hydrogen in the presence of carbon admixed with the wolframite concentrate, similar results were obtained.

EXAMPLE VI

This example describes several methods by which the metallic tungsten and/or iron/tungsten intermetallic species can be prepared, in addition to the methods described in Examples I – V. These procedures provide materials that can then be ground to provide the finely divided material to be leached with the aqueous solution.

Part (a)

A 190.8 g sample of a commerical wolframite concentrate of −100 mesh and containing 71.9% by weight of tungsten trioxide and 8.8% by weight of manganese oxide was reduced under hydrogen at 1000° C for 3.25 hours. A flow of 5 l/minute of hydrogen was maintained during the reduction. The reduction was at least 95.5% complete. X-ray diffraction analysis of the reduced sample showed that the major species were metallic tungsten and an intermetallic iron/tungsten species identified as $Fe_7W_6$. Wolframite was not detected in the reduced sample.

Part (b)

A 33.4 g sample of the wolframite concentrate of Part (a) was reduced at 950° C using the procedure of Part (a), except that the hydrogen was replaced with a flow of ammonia gas of about 410 cm³/minute. After 6 hours, the reduction was substantially complete. X-ray diffraction analysis of the reduced sample indicated that the major species was metallic tungsten. Wolframite was not detected in the reduced sample but there were several unidentified peaks in the diffraction spectrum; some of these unidentified species might not be leachable with the ammonia/oxygen leaching system.

Part (c)

A 2.82 g mixture of the wolframite concentrate of Part (a) admixed with 15.8% by weight of the concentrate of carbon powder was reduced by the procedure of Example I, except that the hydrogen was replaced with a flow of 100 cm³/minute of nitrogen. The reduction was carried out for 5 hours. X-ray diffraction analysis of the reduced mixture showed that the major products were metallic tungsten and the intermetallic iron/tungsten species identified as $Fe_7W_6$. A minor amount of wolframite was also detected.

Part (d)

A 131.8 g sample of a commercial ferberite concentrate of −100 + 250 mesh and containing 74.0% by weight of tungsten trioxide and 18.5% by weight of iron oxide (FeO) was reduced in a horizontal tube furnace at 1000° C for 4 hours. A flow of 2.5 liters/minute of hydrogen was passed over the sample during the reduction. X-ray fluorescence analysis of the reduced sample showed that the reduction was approximately 99.9% complete. X-ray diffraction analysis indicated that the major species in the reduced sample were metallic tungsten and the intermetallic iron/tungsten species identified as $Fe_7W_6$. No ferberite was detected.

Part (e)

Samples of pelletized synthetic iron tungstate (76.0% by weight of tungsten trioxide), each weighing about 4 g, were reduced at 1000° C in the thermal gravimetric analysis apparatus of Example I. A reducing gas was passed over the sample at 100 cm³/minute during the reduction. It was found that when the reducing gas was hydrogen or a 1:1 mixture of hydrogen and ammonia gas, the reduction was complete within 1.33 hours. The same result was obtained when 10% of potassium silicate was admixed with the iron tungstate and hydrogen was used as the reducing gas.

Part (f)

This part shows the effect of temperature on the rate of reduction. Samples of a pelletized ferberite ore (28% by weight of tungsten trioxide) were reduced in hydrogen, with hydrogen flow rates of at least 100 cm³/minute. The hydrogen was replaced with nitrogen while the furnace used was heated to the desired temperature and while the furnace was being cooled after reduction was complete. The rate of weight loss of the samples was monitored, and the hydrogen consumption (i.e., maximum level rate) was measured. The results were as follows:

| Reduction Temperature ° C | Time to Complete Reduction (hours) | Hydrogen Consumption (cm³/min) |
|---|---|---|
| 600 | >3.25 | 0.39 |
| 800 | 2.8 | 4.1 |
| 900 | 1.3 | 9.8 |
| 1000 | 1.3 | 1.2 |
| 1100 | 5.7 | 10.2 |

In the 1100° C runs, some sintering of the samples occurred and the hydrogen consumption rate decreased continuously; the values reported for these sums were the maximum rates.

EXAMPLE VII

A ferberite concentrate of −325 mesh and containing 74.0% by weight of tungsten trioxide was reduced with hydrogen at 1000° C for 4 hours. Samples of the reduced ferberite, each weighing 3 grams, were added to 200 ml of of an agitated aqueous solution of ammonia at 50° C. Ammonia gas and either air or oxygen were passed through the solution. After a period of 5 hours the solution was filtered and the filtrate obtained was analyzed by X-ray fluorescence to determine the amount of tungsten that had been leached from the reduced ferberite. Further experimental details and results are given in TABLE I.

EXAMPLE VIII

A wolframite concentrate of −100 mesh and containing 71.9% by weight of tungsten trioxide was reduced with hydrogen at 950° C for 6 hours. Samples of the reduced wolframite then were added to an agitated aqueous solution of ammonia. Ammonia gas and oxygen were passed through the solution. After a period of time the solution was filtered and the filtrate obtained was analyzed by X-ray fluorescence to determine the amount of tungsten that had been leached from the reduced wolframite. Further experimental details and results are given in TABLE II.

EXAMPLE IX

In this example, water vapor was added to the reducing gas used for reducing a synthetic iron tungstate material in preparing the material for subsequent leaching.

Samples of pelletized synthetic iron tungstate (76.0% by weight of tungsten trioxide) were reduced in a vertical tube furnace through which hydrogen was passed at 100 cm³/minute. Each sample weighed 3.0 g. The hydrogen was saturated with water vapor by passage through a constant temperature water bath prior to passing the hydrogen through the furnace tube. The temperature of the furnace was raised at 5.6° C/minute.

After cooling under nitrogen, the reduced samples were ground and then leached at 50° C with 200 ml of an aqueous solution through which ammonia gas and oxygen were each passed at 100 cm³/minute. At intervals aliquots of the solution were taken and filtered. The filtrate was then analyzed to determine the amount of tungsten that had been leached from the reduced iron tungstate. Further experimental details and results are given in TABLE III.

TABLE I
LEACHING OF EXAMPLE VII REDUCED FERBERITE

| Run No. | 1 | 2 | 3 | 4 | 5 |
|---|---|---|---|---|---|
| Initial Ammonia Conc. (%) | 13 | 13 | 5 | 5 | 7 |
| Gas Flow Rate (cm³/min) | | | | | |
| Ammonia | 100 | 100 | 20 | 20 | 40 |
| Air | 100 | 0 | 100 | 0 | 0 |
| Oxygen | 0 | 100 | 0 | 100 | 120 |
| Approx. Partial Pressure Ratio, oxygen:ammonia | 0.2 | 1.0 | 1.0 | 5.0 | 3.0 |
| % Leaching of Tungsten | 34 | 81 | 50 | 66 | 68 |
| Comment on Leaching Residue** | A | B | A | B | B |
| Metallic tungstem | high | low | high | low | medium |
| $Fe_7W_6$ | medium | lo | low | medium | medium |
| Calcium tungstate | medium | high | medium | high | high |

Notes:
*A = Leaching rate curve indicated leaching continuing
*B = Leaching rate curve indicated leaching terminated after about 3 hours
**analysis of residued by X-ray diffraction. The calcium tungstate was formed as a result of calcium oxide as an impurity in the ferberite concentrate.

TABLE II
LEACHING OF EXAMPLE VIII REDUCED WOLFRAMITE

| Run No. | 1 | 2 | 3 | 4 | 5 | 6 |
|---|---|---|---|---|---|---|
| Aqueous Solution Volume (ml) | 100 | 100 | 100 | 100 | 1000 | 1000 |
| Initial ammonia conc. (%) | 23.1 | 12.2 | 9.1 | 5.2 | 12.2 | 7.4 |
| Temperature (° C) | ambient | 50 | 60 | 80 | 50 | 50 |
| Sample weight (g) | 2.1 | 2.1 | 2.1 | 2.0 | 25.4 | 51.0 |
| Gas Flow (cm³/min) | | | | | | |
| Ammonia | 50 | 50 | 50 | 50 | 50 | 25 |
| Oxygen | 50 | 50 | 50 | 50 | 50 | 75 |
| Leaching Time (hours) | 5 | 5 | 5 | 5 | 4.5 | 23 |
| Leaching of Tungstend (%) | 41 | 82 | 48 | 47 | 88* | 82* |

*substantially no additional leaching of tungsten after 3 hours in Run 5 and after 5 hours in Run 6.

TABLE III
DATA FOR EXAMPLE IX

| Run No. | 1 | 2 | 3 | 4 |
|---|---|---|---|---|
| Water Bath Temperature (° C) | —* | 25 | 50 | 75 |
| Start of Reduction (° C) | 650 | 700 | 750 | 930 |
| Maximum Reduction Temperature (° C) | 1128 | 1133 | 1105 | 1107 |
| Hydrogen Consumption, Rate (cm³/min)** | 14.4 | 18.5 | 18.1 | 12.9 |
| Tungsten Leached (%) | | | | |
| After 1 hour | NL | 43 | 24 | 9 |
| After 3 hours | NL | 87 | 57 | 20 |

TABLE III-continued

| DATA FOR EXAMPLE IX | | | | |
|---|---|---|---|---|
| Run No. | 1 | 2 | 3 | 4 |
| After 6 hours | NL | 91 | 82 | 35 |
| After 10 hours | NL | 98 | 95 | 57 |

*Dry hydrogen was used in Run 1.
**At maximum constant rate of reduction.
NL = Sample was not subjected to leaching.

I claim:

1. A process for preparing a tungstate salt comprising preparing a finely divided material selected from the group consisting of metallic tungsten, intermetallic iron/tungsten species and mixtures thereof, said material having been formed by heating at a temperature in the range of 600° to 1300° C under reducing conditions a tungstate selected from the group consisting of iron tungstate, manganese tungstate and mixtures thereof, treating said material with an aqueous solution at a temperature in the range of 30° to 70° C in the presence of an excess of an oxidizing agent selected from the group consisting of oxygen and hydrogen peroxide, the finely divided material being substantially free of alkaline earth metals and the aqueous solution containing an excess of cations selected from the group consisting of ammonium and sodium ions and mixtures thereof and anions selected from the group consisting of hydroxide, carbonate and bicarbonate ions and mixtures thereof to form a tungstate salt that is soluble in the solution and then separating the tungstate salt from the solution.

2. The process of claim 1 wherein the oxidizing agent is oxygen, the cations include ammonium ions and the anions include hydroxide ions.

3. The process of claim 1 wherein the tungstate is in the form of an ore or concentrate selected from the group consisting of ferberite, huebnerite and wolframite.

4. The process of claim 1 wherein the reducing agent is hydrogen that has been saturated with water at a temperature in the range of 25° to 75° C.

5. The process of claim 1 wherein ammonium tungstate is isolated from the solution and then converted to tungsten trioxide.

6. The process of claim 1 wherein the finely divided material contains an alkaline earth metal as an impurity and at least one of the anion groups in the solution forms an alkaline earth metal compound which is insoluble in the solution.

7. The process of claim 6 wherein the anions forming the insoluble alkaline earth metal compound are carbonate ions.

* * * * *